United States Patent
Kern et al.

(10) Patent No.: US 6,686,547 B2
(45) Date of Patent: *Feb. 3, 2004

(54) RELAY FOR A TRANSFER MECHANISM WHICH TRANSFERS POWER BETWEEN A UTILITY SOURCE AND A STAND-BY GENERATOR

(75) Inventors: Robert D. Kern, Waukesha, WI (US); Gerald C. Ruehlow, Oconomowoc, WI (US); Francis X. Wedel, Lake Mills, WI (US); Jeffrey J. Jonas, Waukesha, WI (US)

(73) Assignee: Generac Power Systems, Inc., Waukesha, WI (US)

( * ) Notice: Subject to any disclaimer, the term of this patent is extended or adjusted under 35 U.S.C. 154(b) by 54 days.

This patent is subject to a terminal disclaimer.

(21) Appl. No.: 09/772,204

(22) Filed: Jan. 29, 2001

(65) Prior Publication Data

US 2002/0057145 A1 May 16, 2002

Related U.S. Application Data

(63) Continuation-in-part of application No. 09/377,722, filed on Aug. 19, 1999, now Pat. No. 6,181,028.

(51) Int. Cl.[7] .................................................. H01H 1/02
(52) U.S. Cl. ....................................... 200/268; 200/240
(58) Field of Search .................................. 200/263, 268, 200/240

(56) References Cited

U.S. PATENT DOCUMENTS

| | | | | | |
|---|---|---|---|---|---|
| 2,547,947 | A | * | 4/1951 | Kleis et al. ................. | 200/266 |
| 3,518,390 | A | * | 6/1970 | Sasamoto .............. | 200/267 X |
| 3,532,844 | A | * | 10/1970 | Gwyn ........................ | 200/266 |
| 4,933,520 | A | * | 6/1990 | Ohba et al. ................ | 200/268 |
| 5,049,845 | A | * | 9/1991 | Yokoyama et al. ..... | 200/240 X |
| 6,181,028 | B1 | * | 1/2001 | Kern et al. .................. | 307/64 |

* cited by examiner

*Primary Examiner*—Renee Luebke
(74) *Attorney, Agent, or Firm*—Boyle Fredrickson Newholm Stein & Gratz S.C.

(57) ABSTRACT

A relay is provided for a transfer mechanism which transfers power between a utility source and a stand-by electrical generator. The relay incorporates contacts formed from two distinct materials. A backing portion of each contact is formed from copper and a contacting portion is deposited on the backing portion. The contacting portion is formed from tungsten. The arrangement of the contact minimizes the potential for failure of the transfer mechanism when the transfer mechanism is exposed to significant current and/or heating during operation thereof.

20 Claims, 6 Drawing Sheets

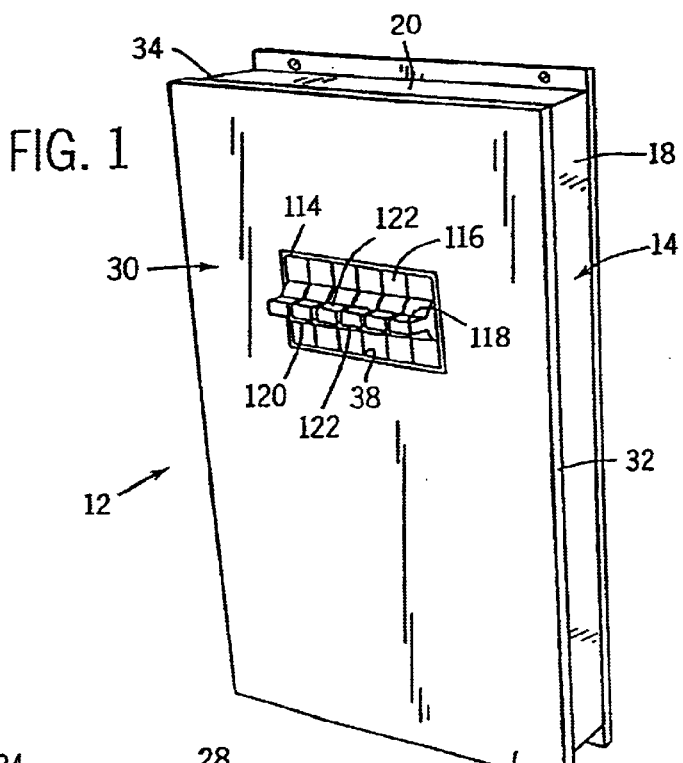
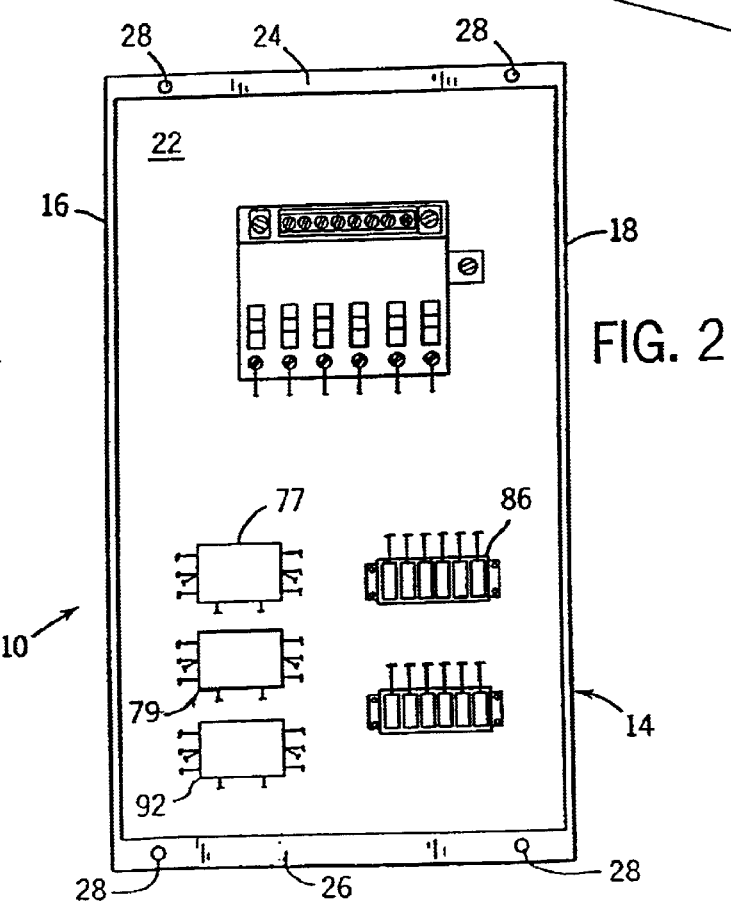

RELAY FOR A TRANSFER MECHANISM WHICH TRANSFERS POWER BETWEEN A UTILITY SOURCE AND A STAND-BY GENERATOR

RELATED APPLICATIONS

This application is a continuation-in-part of U.S. Ser. No. 09/377,722, filed Aug. 19, 1999 now U.S. Pat. No. 6,181,028, and entitled "Transfer Mechanism For Transferring Power Between a Utility Source and a Stand-by Generator."

FIELD OF THE INVENTION

This invention relates to stand-by generators, in particular, to a relay for a transfer mechanism which transfers the supply of power between a utility source and a stand-by generator.

BACKGROUND OF THE INVENTION

As is known, virtually all facilities which utilize electric power receive such power from a utility company. Typically, such utility companies have an excellent record of providing uninterrupted or infrequently interrupted power at proper voltage levels and line frequency. However, due to the increasing demands for electricity, power outages have become more frequent. While such outages usually last for a only a short duration, an extended power outage may cause more than simple aggravation for customers of the utility company. By way of example, for a residential customer, any power outage renders a home owner's sump pump inoperable. If a power outage occurs during a rain storm, it is quite possible that the failure of the sump pump to operate will result in the flooding of a home owner's basement.

In order to overcome these occasional disruptions in service, various customers, including home owners, have equipped their facilities with stand-by power systems. These stand-by power systems include internal combustion engines which drive electrical generators. If the commercial power from the utility company fails, the internal combustion engine is automatically started causing the electrical generator to generate power. When the power generated by the generator reaches the voltage and frequency desired by the customer, a manually operated transfer switch transfers the load imposed by the customer from the commercial power lines to the generator.

Typically, the transfer mechanism incorporates a switch which isolates the power supplied by the utility company and the generator. In a residential application, a home owner manually flips a switch between the utility source and the generator in order to provide power to the electrical system of the home. However, due to a potential time delay before the home owner can flip the switch, a significant amount of damage may be sustained by a home owner before power is supplied to the electrical system of the home. For example, an extended power outage may result in foodstuffs spoiling within a refrigerator or melting within a freezer. Therefore, it is highly desirable to provide a transfer mechanism which automatically transfers power from the utility company to the generator whenever the generator is activated.

Further, prior art transfer mechanisms require a home owner to transfer the entire electrical system of the home onto the generator. Such an arrangement does not allow a home owner the ability to decide which circuits of a home's electrical system to be powered. As such, it is also desirable to provide a transfer mechanism which allows various branch circuits of a home to be brought on line separately, rather than at once, to allow for loads with large starting requirements to be brought up to speed before bringing the other circuit branches of the home on line thereby insuring that adequate power is provided by the generator to start such loads.

It can be appreciated that, in operation, in order to transfer power between the utility company and the generator, significant voltage and current flow through the transfer mechanism during such transfer. As such, the components of the transfer mechanism must be able to perform in such an environment without failure. As is known, the transfer mechanism must operate when exposed to high current and/or heat. Therefore, it is highly desirable to provide components for a transfer mechanism which minimize the potential for failure of the transfer mechanism when the transfer mechanism is exposed to significant current and/or heat during operation thereof.

Therefore, it is a primary object and feature of the present invention to provide for a transfer mechanism which transfers the power supplied to a load between a utility source and a stand-by generator.

It is a further object and feature of the present invention to provide a relay for a transfer mechanism which automatically transfers the power supplied to a load from the utility source to the generator in response to a power outage.

It is a still further object and feature of the present invention to provide a relay for a transfer mechanism which transfers the power supplied to a load between a utility source and a generator such that the transfer mechanism is less prone to failure than prior transfer mechanisms.

It s a still further object and feature of the present invention to provide a relay for a transfer mechanism which is reliable and inexpensive to manufacture.

SUMMARY OF THE INVENTION

In accordance with the present invention, a relay is provided relaying electrical power between first and second terminals thereof. The relay includes a stationary contact having a backing portion operatively connected to the first terminal and formed from a first material. The stationary contact also includes a contacting portion deposited on the backing portion and formed from a second material. A movable arm has a first end operatively connected to the second terminal and a second opposite end. The relay includes a movable contact having a backing portion operatively connected to the second end of the movable arm and formed from the first material. A contacting portion is deposited on the backing portion of the movable contact and is formed from the second material. A coil is operatively connected to the movable arm such that the movable arm is movable between a first contacting position wherein the contacting portion of the movable contact engages the contacting portion of the stationary contact and a second non-contacting position wherein the contacting portion of the movable contact is disengaged from the contacting portion of the stationary contact in response to an electrical charge on the coil.

A biasing structure is provided for urging the movable arm towards the non-contacting position. It is contemplated that first material be copper and the second material be tungsten. The first surface of the backing portion of the stationary contact has a first diameter and the second surface of the backing portion of the stationary contact has a second diameter which is greater than the first diameter. In addition, the first surface of the contacting portion of the movable contact has a first diameter and the second surface of the contacting portion of the movable contact has a second diameter which is greater than the first diameter. The first surface of the contacting portion of the movable contact is generally arcuate in shape and terminates at a crown.

In accordance with a still further aspect of the present invention, a contact for a relay is provided. The relay relays electrical power between first and second terminals thereof. The contact includes a backing portion formed from copper and a contacting portion deposited on the backing portion. The contacting portion is formed from tungsten.

The contacting portion of the contact includes a first surface and a second surface which engages the backing portion of the contact. The first and second surfaces of the contacting portion are spaced from each other by an outer edge. The first surface of the contacting portion has a first diameter and the second surface of the contacting portion has a second diameter which is greater than the first diameter. The first surface of the contacting portion is generally arcuate in shape and terminates at a crown. The backing portion includes a first surface which engages the contacting portion and a second surface spaced from the first surface of the backing portion by an outer edge. A mounting head depends from the second surface of the backing portion to facilitate mounting of the contact to an element.

BRIEF DESCRIPTION OF THE DRAWINGS

The drawings furnished herewith illustrate a preferred construction of the present invention in which the above advantages and features are clearly disclosed as well as others which will be readily understood from the following description of the illustrated embodiment.

In the drawings:

FIG. 1 is an isometric view of an enclosure for housing a transfer mechanism in accordance with the present invention;

FIG. 2 is a front elevational view, with its cover removed, of the enclosure of FIG. 1;

DETAILED DESCRIPTION OF THE INVENTION

Figure 3:
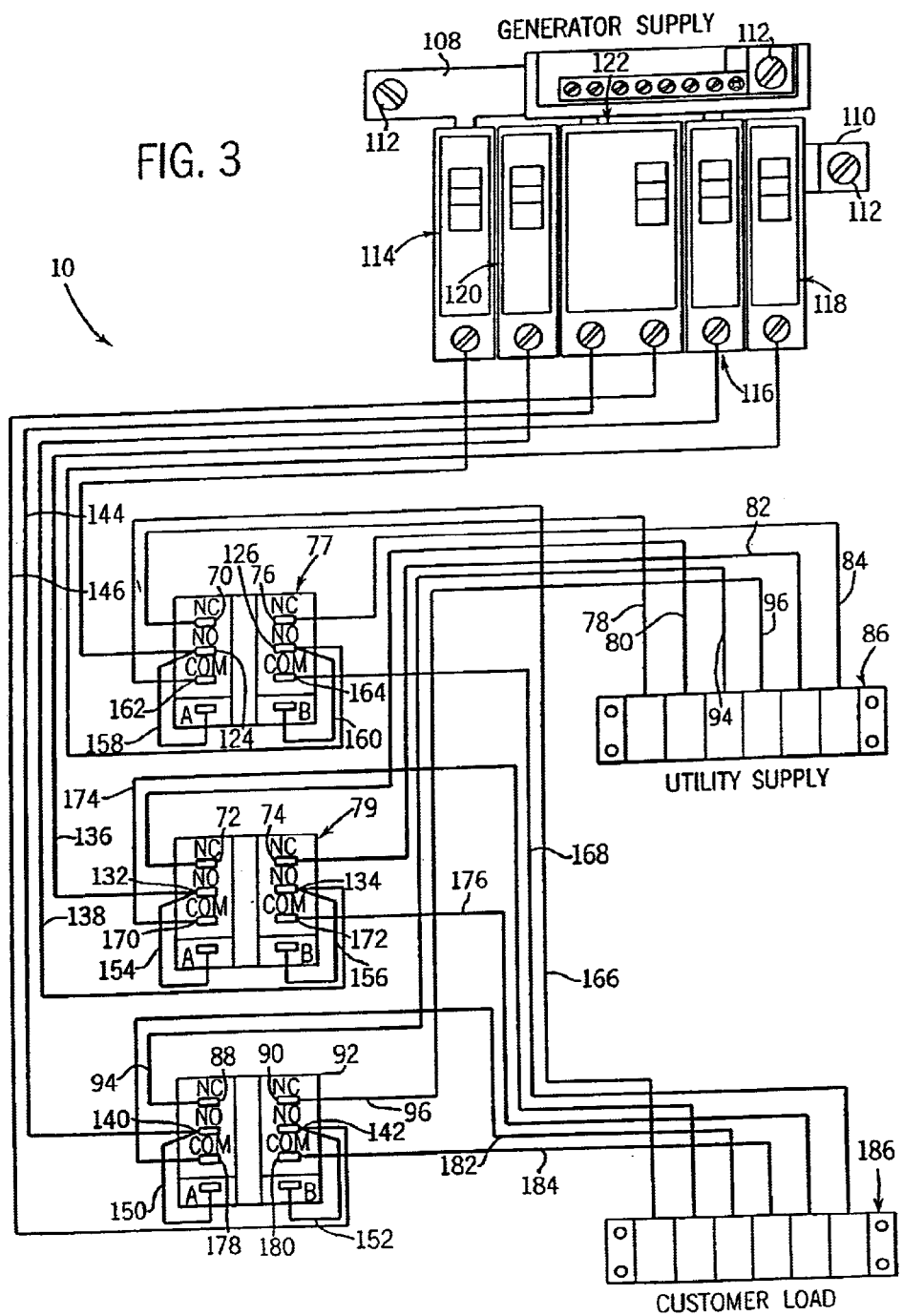
FIG. 3 is a wiring diagram of the transfer mechanism of the present invention.

Referring to FIGS. 2 and 3, a transfer mechanism in accordance with the present invention is generally designated by the reference numeral 10. It is contemplated that transfer mechanism 10 be mounted within a housing 12, FIGS. 1 and 2. Housing 12 includes a cabinet 14. Cabinet 14 defines a pair of sidewalls 16 and 18, a top wall 20 extending between upper ends of sidewalls 16 and 18, a bottom wall (not shown) extending between and interconnecting the lower ends of sidewalls 16 and 18, and a rear panel 22. Upper and lower mounting flanges 24 and 26 project from opposite ends of rear panel 22 of cabinet 14 and include apertures 28 therein for allowing cabinet 14 to be mounted on a wall within the interior of a building via screws or the like.

Housing 12 further includes a cover 30 defined by a pair of sidewalls 32, a top wall 34 extending between the upper ends of sidewalls 32, a bottom wall (not shown) extending between and interconnecting the lower ends of sidewalls 32, and a front panel 36. Front panel 36 of cover 30 includes an opening 38 therein so as to allow for a plurality of circuit breakers to project therethrough, as hereinafter described. Cover 30 may be positioned on cabinet 14 to limit access to transfer mechanism 10 contained therein.

Figure 4:
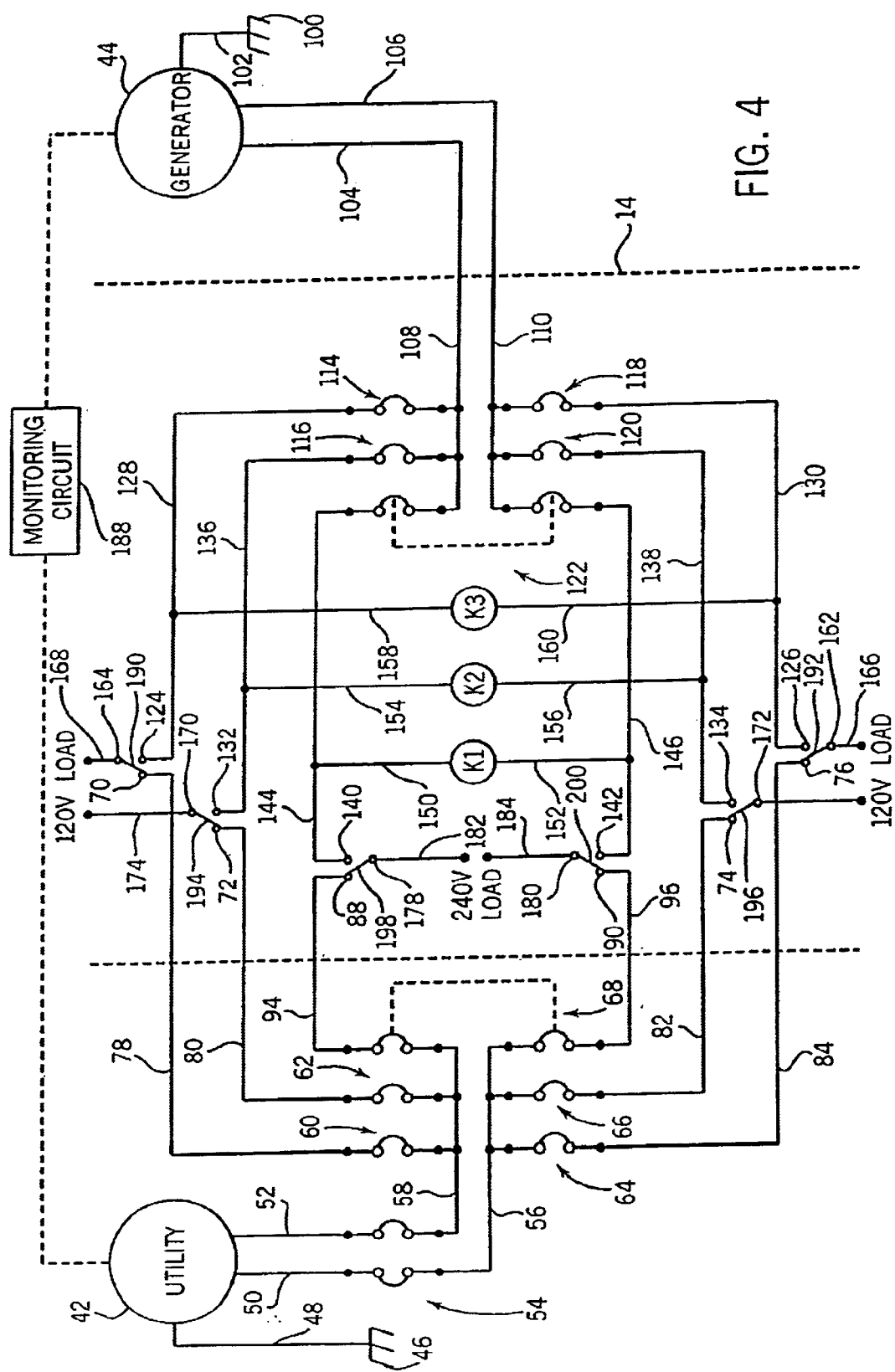
FIG. 4 is a schematic diagram of a first embodiment of the transfer mechanism of the present invention.

Referring to FIG. 4, transfer mechanism 10 is interposed between a utility source 42 and a stand-by generator 44. As is conventional, utility source 42 is interconnected to ground 46 through line 48 and supplies ±120 volts across lines 50 and 52. Lines 50 and 52 are connected to a main circuit breaker 54 within a main distribution panel located in the interior of a building. As is conventional, two bus bars 56 and 58 are connected to main circuit breaker 54. A plurality of single pole circuit breakers 60 and 62 are interconnected to bus bar 58. Similarly, a plurality of single pole circuit breakers 64 and 66 are interconnected to bus bar 56. Circuit breakers 60, 62, 64 and 66 are operatively connected to corresponding individual branch circuits within the building which requires 120 volt service, in a manner hereinafter described. A double pole circuit breaker 68 may be attached to both bus bars 56 and 58. Circuit breaker 68 is operatively connected to a corresponding individual branch circuit which requires 240 volt service, in a manner hereinafter described.

As best seen in FIGS. 3–4, circuit breakers 60 and 64 are interconnected to normally closed contacts 70 and 76, respectively, of a first double pole, double throw power relay 77 through corresponding lines 78 and 84, respectively. Circuit breakers 62 and 66 are interconnected to normally closed contacts 72 and 74, respectively, of a second double pole, double throw power relay 79 through lines 80 and 82, respectively. Double pole circuit breaker 68 is interconnected to normally closed contacts 88 and 90 of a third double pole, double throw power relay 92 through corresponding lines 94 and 96, respectively. Referring to FIGS. 2 and 3, it is contemplated to mount a terminal block 86 to rear panel 22 of cabinet 14 in order to facilitate the connecting of the circuit breakers to the power relays.

As is conventional, circuit breakers 60, 62, 64, 66, and 68 may be toggled between off-positions wherein the corresponding power relays 77, 79 and 92 are isolated from utility source 42 and on-positions wherein the corresponding power relays 77, 79 and 92 are protected from the potential overload by utility source 42.

Generator 44 is interconnected to ground 100 through line 102, and supplies ±120 volts across lines 104 and 106. Lines 104 and 106 are connected to corresponding bus bars 108 and 110, respectively, which are mounted to rear panel 22 of cabinet 14. A plurality of single pole circuit breakers 114 and 116 are interconnected to bus bar 108. Similarly, a plurality of single pole circuit breakers 118 and 120 are interconnected to bus bar 110. Circuit breakers 114, 116, 118, and 120 are operatively connected to corresponding individual branch circuits within the building which require 120 volt service, in a manner hereinafter described. A double-pole circuit breaker 122 is interconnected to both bus bars 108 and 110 and is operatively connected to a corresponding individual branch circuit within the building which requires 240 volt service, in a manner hereinafter described.

Circuit breakers 114 and 118 are interconnected to normally opened contacts 124 and 126, respectively, of power relay 77 by corresponding lines 128 and 130, respectively. Circuit breakers 116 and 120 are interconnected to normally open contacts 132 and 134, respectively, of power relay 79 through corresponding lines 136 and 138, respectively. Double-pole circuit breaker 122 is interconnected to normally open contacts 140 and 142 of relay 92 through corresponding lines 144 and 146, respectively.

As is conventional, circuit breakers 114, 116, 118, 120 and 122 may toggle between off-positions wherein the corresponding power relays 77, 79 and 92 are isolated from generator 44 and on-positions wherein the corresponding power relays 77, 79 and 92 are protected from potential overload by generator 44.

Power relay 92 includes a magnetic coil K1 having terminals A and B. Terminal A of power relay 92 is interconnected to normally open contact 140 by line 150. Terminal B of power relay 92 is interconnected to normally open contact 142 by line 152. Similarly, power relays 77 and 79 include corresponding magnetic coils K3 and K2, respectively, having terminals A and B. Terminal A of power relay 79 is interconnected to normally open contact 132 by line 154. Terminal B of power relay 79 is interconnected to normally opened contact 134 by line 156. Likewise, terminal A of power relay 77 is interconnected to normally open contact 124 by line 158 and terminal B of power relay 77 is interconnected to normally open contact 126 by line 160.

The common terminals 162 and 164 of power relay 77 are connected by lines 166 and 168, respectively, to corresponding individual branch circuits within the building which require 120 volt service. Common terminals 170 and 172 are interconnected by lines 174 and 176, respectively, to corresponding individual branch circuits within the building which also require 120 volt service. Common terminals 178 and 180 of power relay 92 are interconnected by lines 182 and 184, respectively, to a corresponding branch circuit within the building which requires 240 volt service. Referring to FIGS. 2 and 3, it is contemplated to mount a terminal block 186 on rear panel 22 of cabinet 14 in order to facilitate connecting of the common terminals of the power relays to various loads.

Under normal operating circumstances, main circuit breaker 54 and circuit breakers 60, 62, 64, 66 and 68 are toggled to their on-positions. Movable contacts 190 and 192 of power relay 77 are engaged with normally closed contacts 70 and 76, respectively; movable contacts 194 and 196 of power relay 79 are engaged with normally closed contacts 72 and 74, respectively; and movable contacts 198 and 200 of power relay 92 are engaged with normally closed contacts 88 and 90, respectively. As described, utility source 42 provides power on lines 50 and 52 to corresponding loads.

As best seen in FIG. 4, a monitoring circuit 188 is operatively connected to utility source 42 and generator 44. As is conventional, monitoring circuit 188 monitors the power supplied by utility source 42. In response to a power outage from utility source 42, monitoring circuit 188 starts the internal combustion engine of generator 44. As heretofore described, a starting of the internal combustion motor causes the electrical generator of generator 44 to generate electrical power across lines 104 and 106.

With circuit breakers 114 and 118 toggled to their on-positions, current flows through magnetic coil K3 of power relay 77 such that the magnetic coil K3 becomes magnetized and attracts movable contacts 190 and 192 within power relay 77. As a result, movable contacts 190 and 192 disengage from normally closed contacts 70 and 76, respectively, and close against corresponding normally open contacts 124 and 126, respectively, so as to operatively connect corresponding loads to generator 44.

With circuit breakers 116 and 120 toggled to their on-positions, current flows through magnetic coil K2 of power relay 79 such that the magnetic coil K2 becomes magnetized and attracts movable contacts 194 and 196 within power relay 79. As a result, movable contacts 194 and 196 disengage from normally closed contacts 72 and 74, respectively, and close against corresponding normally open contacts 132 and 134, respectively, so as to operatively connect corresponding loads to generator 44.

With circuit breaker 122 toggled to its on-position, current flows through magnetic coil K1 of power relay 92 such that the magnetic coil K1 becomes magnetized and attracts movable contacts 198 and 200 within power relay 92. As a result, movable contacts 198 and 200 disengage from normally closed contacts 88 and 90, respectively, and close against corresponding normally open contacts 140 and 142, respectively, so as to operatively connect a corresponding load to generator 44.

In response to the restoration of power from utility source 42, monitoring circuit 188 stops the internal combustion engine of generator 44. By stopping the internal combustion engine, the electrical generator of generator 44 no longer generates power across lines 104 and 106 and current ceases to flow through magnetic coils K1, K2 and K3 of power relays 92, 79 and 77, respectively. As a result, movable contacts 190 and 192 of power relay 77 disengage from normally open contacts 124 and 126, respectively, and reclose against corresponding normally closed contacts 70 and 76, respectively, so as to operatively connect corresponding loads to utility source 42.

Similarly, movable contacts 194 and 196 disengage from normally open contacts 132 and 134, respectively, and reclose against corresponding normally closed contacts 72 and 74, respectively, so as to operatively connect corresponding loads to utility source 42. In addition, movable contacts 198 and 200 disengage from normally open contacts 140 and 142, respectively, and reclose against corresponding normally closed contacts 88 and 90, respectively, so as to operatively connect a corresponding load to utility source 42. Thereafter, monitoring system 188 continues to monitor the power supplied by utility source 42 and repeats the above-described process if a power outage from utility source 42 is detected.

Figure 5:
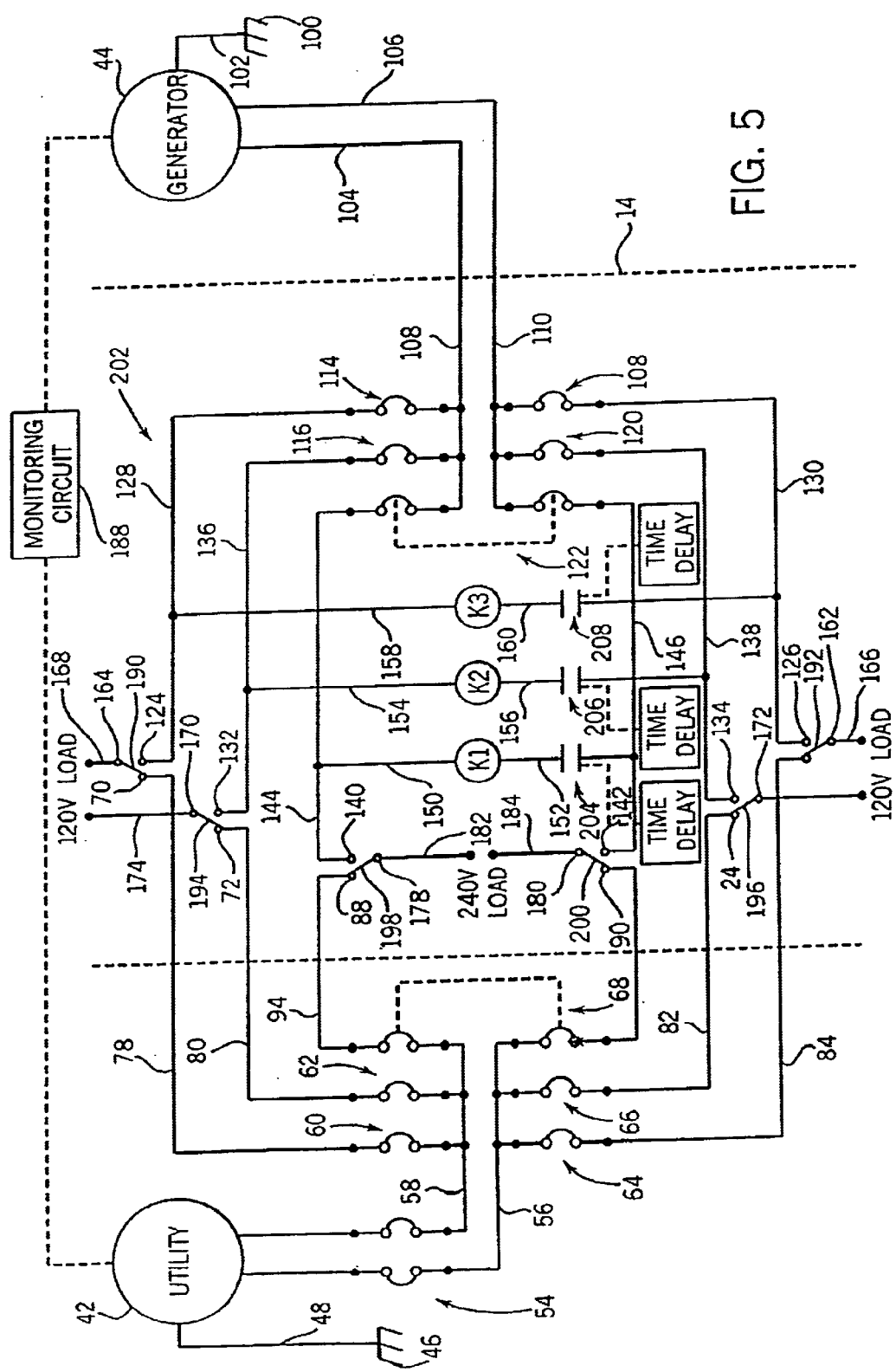
FIG. 5 is a schematic view of a second embodiment of the transfer mechanism of the present invention.

Referring to FIG. 5, an alternate embodiment of the transfer mechanism is shown. The alternate embodiment of the transfer mechanism is generally designated by the reference numeral 202. Transfer mechanism 202 is identical in structure to transfer mechanism 10 with the exception of time delay switches 204, 206 and 208 as hereinafter described. As such, common reference characters will be utilized.

In order to sequentially bring the various loads on line with generator 44, a first time delay switch 204 is positioned between magnetic coil K1 of power relay 92 and normally open contact 142; a second time delay switch 206 is positioned between magnetic coil K2 of power relay 79 and normally open contact 134; and a third time delay switch 208 is positioned between magnetic coil K3 of power relay 77 and normally open contact 126. As generator 44 is started as heretofore described, time delay switches 204, 206 and 208 are normally open so as to prevent the flow of current through magnetic coils K1, K2 and K3, respectively. Thereafter, time delay switches 204, 206 and 208 are sequentially closed over a predetermined time period in order to allow for the flow of current through corresponding magnetic coils K1, K2 and K3, respectively. As current flows through each magnetic coil K1, K2 and K3, various loads are operatively connected to generator 44 in the matter heretofore described with respect to transfer switch 10.

Further, in the second embodiment, it can be appreciated to utilize DC control relays in place of power relays 77, 79 and 92 and driving them directly using staggered delays.

Figure 6:
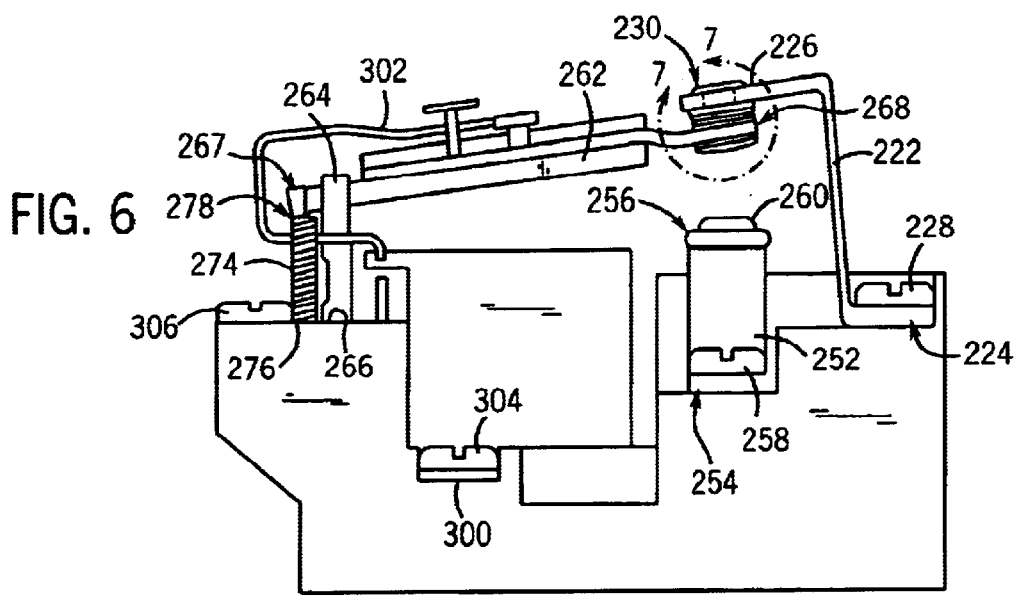
FIG. 6 is a side elevational view of a relay for the transfer mechanism of FIGS. 1–5.

Referring to FIG. 6, an example of a relay for use in accordance with the present invention is generally designated by the reference numeral 220. Relay 220 includes a first terminal 222 having first and second opposite ends 224 and 226, respectively. First end 224 is intended to be operatively connected to utility source 42 through screw 228. Stationary contact 230 is mounted to the second end 226 of terminal 222 as hereinafter described.

Figure 7:
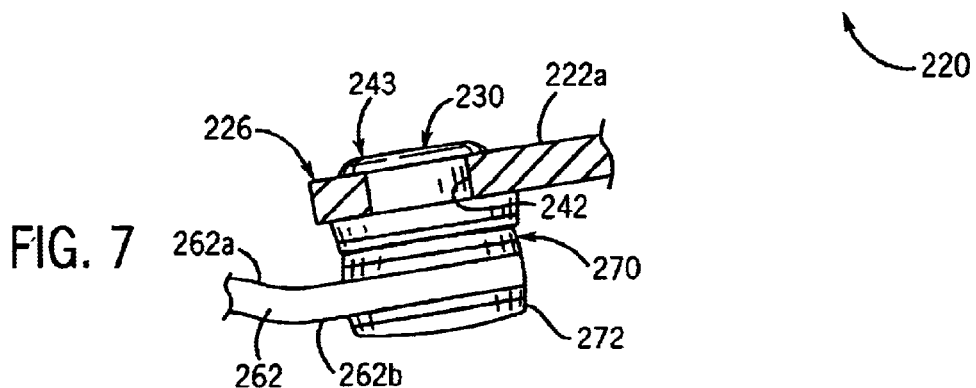
FIG. 7 is an enlarged, side elevational view taken along line 7—7 of FIG. 6.
Figure 8:
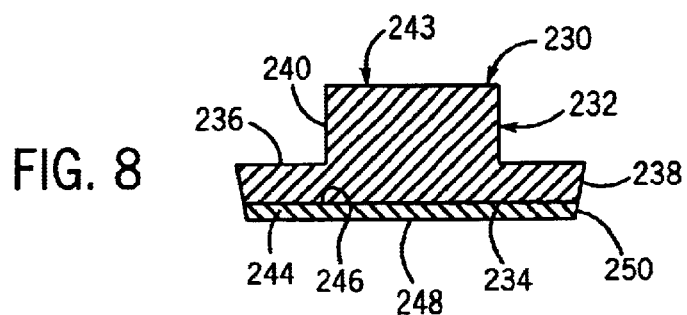
FIG. 8 is a cross-sectional view of a stationary contact for use in connection with the relay of FIG. 6.

Referring to FIGS. 7 and 8, stationary contact 230 includes a backing portion 232 formed of pure copper. Backing portion 232 of stationary contact 230 includes a first contacting portion engaging surface 234 and a second, terminal engaging surface 236 spaced therefrom by an outer edge 238. The diameter of the contacting portion engaging surface 234 is less than the diameter of the terminal engaging surface 236 such that outer edge 238 of backing portion 232 is tapered.

Mounting head 240 extends from terminal engaging surface 236 and has a diameter less than the diameter of opening 242 in second end 226 of terminal 222. As best seen in FIG. 7, mounting head 240 extends through opening 242 in second end 226 of terminal 222. Terminal end 243 of mounting head 230 is either melted or swagged onto side 222a of terminal 222 so as to capture terminal 222 between terminal end 243 of mounting head 240 and terminal engaging surface 236 of stationary contact 230 so as to retain stationary contact 230 on second end 226 of terminal 222.

Stationary contact 230 further includes a contacting portion 244 deposited on contacting portion engaging surface 234 of backing portion 232 of stationary contact 230. Contacting portion 244 is formed of pure tungsten and includes a backing portion engaging surface 246 which overlaps the contacting portion engaging surface 234 of backing portion 232 of stationary contact 230. Contacting portion 244 of stationary contact 230 further includes contacting surface 248 which is spaced from backing portion engaging surface 246 thereof by an outer edge 250. Contacting surface 248 of contacting portion 244 of stationary contact 230 has a diameter which is less than the diameter of backing portion engaging surface 246 such that outer edge 250 of contacting portion 244 of stationary contact 230 is generally tapered.

Referring back to FIG. 6, relay 220 further includes a second terminal 252 having first and second opposite ends 254 and 256, respectively. End 254 of second terminal 252 may be connected to stand-by generator 44 through screw 258. Second stationary contact 260 is interconnected to second end 256 of second terminal 252. Second stationary contact 260 is identical in structure to first stationary contact 230, and as such, the description heretofore of stationary contact 230 is understood to describe second stationary contact 260 as if fully described herein. In addition, second stationary contact 260 is mounted to second end 256 of second terminal 252 in the same manner as first stationary contact 230 is mounted to second end 226 of first terminal 222. As such, the description heretofore of the mounting of first stationary contact 230 to second end 226 of first terminal 222 is understood to describe the mounting of second stationary contact 260 to second end 256 of second terminal 252 as if fully described herein.

Relay 220 further includes an arm 262 pivotably mounted to support 264 extending vertically from an upper surface 266 of relay 220. Arm 262 includes a first end 267 and a second, opposite end 268 having first and second movable contacts 270 and 272, respectively, mounted on corresponding sides 262a and 262b thereof. Arm 262 is movable between a first position, FIG. 6, wherein first movable contact 270 engages first stationary contact 230 and a second position wherein second movable contact 272 engages second stationary contact 260. Spring 274 has a first end 276 mounted to the upper surface 266 of relay 220 and a second, opposite end 278 engaging first end 267 of arm 262 so as to urge arm 262 towards the first position.

Figure 9:
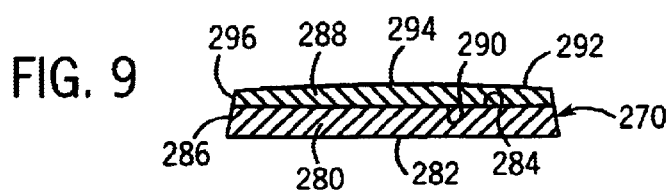
FIG. 9 is a cross-sectional view of a movable contact for use in connection with the relay of FIG. 6.

As hereinafter described, first and second movable contacts 270 and 272, respectively, are identical in structure, and as such, the description hereinafter of first movable contact 270 is understood to describe second movable contact 272 as if fully described hereinafter. Referring to FIGS. 7 and 9, first movable contact 270 includes backing portion 280 formed of pure copper. Backing portion 280 includes an arm engaging portion 282 which is secured to second end 268 of arm 262 in any suitable manner. Backing portion 280 of movable contact 270 further includes contacting portion engaging surface 284 which is spaced from arm engaging surface 282 by outer edge 286. Contacting portion engaging surface 284 of movable contact 270 has a diameter less than arm engaging surface 282 of movable contact 270 such that outer edge 286 of backing portion 280 of first movable contact 270 is tapered.

First movable contact 270 further includes a contacting portion 288 having a backing portion engaging surface 290 which overlaps and engages contacting portion engaging surface 284 of backing portion 280 of first movable contact 270. Contacting portion 288 has a contacting surface 292 directed towards first stationary contact 230. Contacting surface 292 of contacting portion 288 has a generally arcuate shape and terminates at a crown 294. Contacting surface 292 of contacting portion 288 of first movable contact 270 is spaced from backing portion engaging surface 290 of contacting portion 288 of first movable contact 270 by an outer edge 296. The diameter of contacting surface 292 of contacting portion 299 of first movable contact 270 has a diameter less than the diameter of backing portion engaging surface 290 of contacting portion 288 of first movable contact 270 such that outer edge 296 of contacting portion 288 of first movable contact 270 is tapered.

Figure 10:
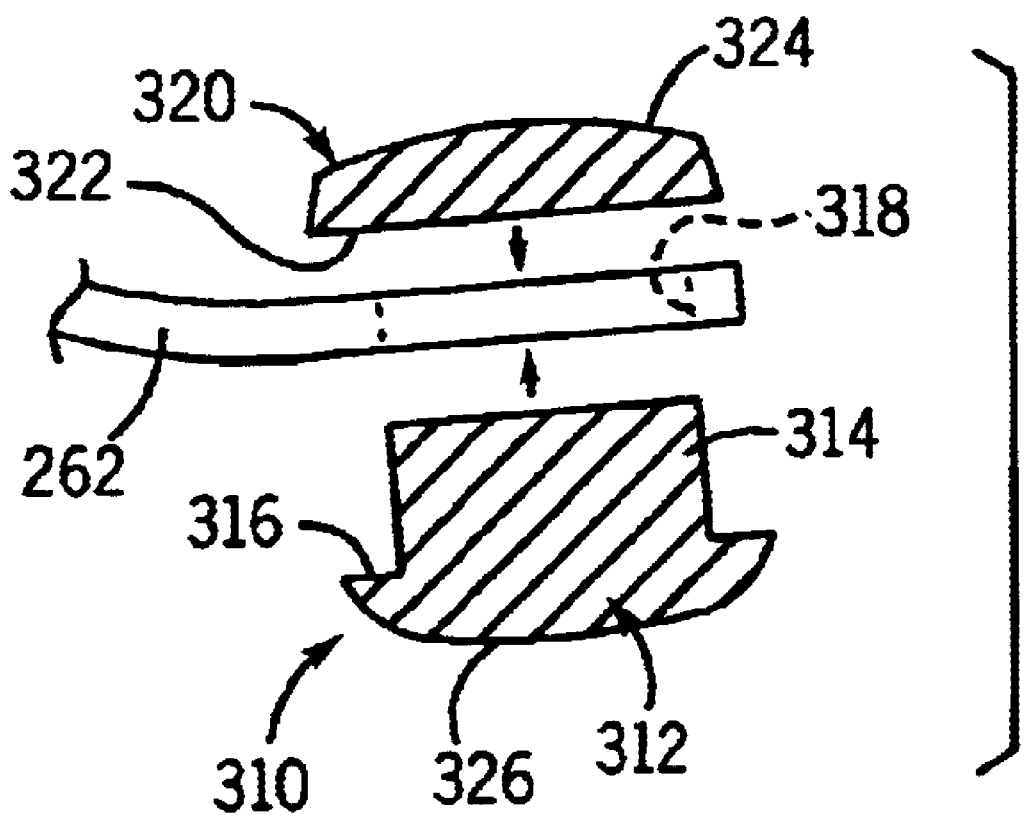
FIG. 10 is a cross-sectional view of an alternate embodiment of a movable contact for use with the relay of FIG. 6.

Referring to FIG. 10, an alternate embodiment of a movable contact is generally designated by the reference numeral 310. Movable contact 310 is formed from silver cadmium oxide and takes the form a rivet. Movable contact 310 includes a first contacting portion 312 having a mounting head 314 extending therefrom. Mounting head 314 extends from a terminal engaging surface 316 of first contacting portion 312 and has a diameter less than the diameter of opening 318 in arm 262.

Mounting head 314 extends through opening 318 in arm 262 wherein a second contacting portion 320 is riveted thereon. Second contacting portion 320 includes a terminal engaging surface 322 and a contacting surface 324.

Similarly, First contacting portion 310 also includes a contacting surface 326. It can be appreciated that contacting surfaces 326 and 324 of first and second contacting portions 312 and 320, respectively, are tapered to facilitate electrical contact with corresponding stationary contacts 260 and 230.

Referring to FIG. 6, arm 262 is electrically connected to load terminal 300 through line 302. Load terminal 300 may be connected to a load through screw 304. In addition, the coil of relay 220 is electrically connected to stand-by generator 44 through screw 306 such that relay 220 operates in a such a manner as heretofore described with respect to power relays 77, 79 and 92.

Various modes of carrying out the invention are contemplated as being within the scope of the following claims particularly pointing out and distinctly claiming the subject matter which is regarded as the invention.

We claim:

1. A relay for a transfer mechanism for transferring the supply of electrical power to a load between a generator which generates power when started and a utility source, the transfer mechanism monitoring the power supplied by the utility source and starting the generator in response to a power outage from the utility source, the relay comprising:
    a utility input connectable to the utility source, the utility input including a utility stationary contact having:
        a backing portion operatively connected to a utility terminal and formed from a first material; and
        a contacting portion deposited on the backing portion and formed from a second material;
    a generator input connectable to the generator, the generator input including a generator stationary contact having:
        a backing portion operatively connected to a generator terminal and formed from the first material; and
        a contacting portion deposited on the backing portion and formed from the second material;
    an output terminal connectable to a load;
    a movable arm having a first end operatively connected to the output terminal and a second opposite end;
    a movable contact connected to the second end of the movable arm; and
    a coil connectable to the generator and being operatively connected to the movable arm such that the movable arm is movable between a first contacting position wherein the movable contact engages the contacting portion of the utility stationary contact and a second non-contacting position wherein the movable contact is disengaged from the contacting portion of the utility stationary contact in response to the application of power to the coil by the generator.

2. The relay of claim 1 further comprising a biasing structure for urging the movable arm towards the non-contacting position.

3. The relay of claim 1 wherein the first material is copper and the second material is tungsten and wherein the movable contact is formed from silver cadmium oxide.

4. The relay of claim 1 wherein the contacting portion of the utility stationary contact includes a first surface directed towards the movable contact and a second surface engaging the backing portion of the utility stationary contact, the first and second surfaces of the stationary contact being interconnected by an outer edge.

5. The relay of claim 4 wherein the first surface of the contacting portion of the utility stationary contact has a first diameter and the second surface of the contacting portion of the utility stationary contact has a second diameter greater than the first diameter.

6. The relay of claim 1 wherein the back portion of the utility stationary contact includes:
    a first surface engaging the contacting portion of the utility stationary contact;
    a second surface interconnected to the first surface of the backing portion of the utility stationary contact by an outer edge; and
    a mounting head depending from the second surface of the backing portion of the utility stationary contact to facilitate the connection of the stationary contact to the utility terminal.

7. The relay of claim 6 wherein the first surface of the backing portion of the utility stationary contact has a first diameter and the second surface of the backing portion of the utility stationary contact has a second diameter greater than the first diameter.

8. The relay of claim 1 wherein the contact portion of the movable contact includes a first surface directed towards the utility stationary contact and a second surface engaging the backing portion of the movable contact, the first and second surfaces of the movable contact being spaced from each other by an outer edge.

9. The relay of claim 8 wherein the first surface of the contacting portion of the movable contact has a first diameter and the second surface of the contacting portion of the movable contact has a second diameter greater than the first diameter.

10. The relay of claim 8 wherein the first surface of the contacting portion of the movable contact is generally arcuate and terminates at a crown.

11. The relay of claim 1 wherein the movable contact includes:
    a backing portion operatively connected to the second end of the movable arm and formed from the first material; and
    a contacting portion deposited on the backing portion and formed from the second material.

12. The relay of claim 11 wherein the backing portion of the movable contact includes a first surface engaging the contacting portion of the movable contact and a second surface interconnected to the second end of the movable arm and spaced from the first surface of the backing portion of the movable contact by an outer edge.

13. The relay of claim 12 wherein the first surface of the backing portion of the movable contact has a first diameter and the second surface of the backing portion of the movable contact has a second diameter greater than the first diameter.

14. A relay for a transfer mechanism for transferring the supply of electrical power to a load between a generator which generates power when started and a utility source, the transfer mechanism monitoring the power supplied by the utility source and starting the generator in response to a power outage from the utility source, the relay comprising:
    a utility input connectable to the utility source, the utility inputs including a utility stationary contact having:
        a backing portion operatively connected to a utility terminal and formed from a first material, the backing portion including:
            a first surface;
            a second surface interconnected to the first surface of the backing portion of the utility stationary contact by an outer edge; and
            a mounting head depending from the second surface of the backing portion of the utility stationary contact to facilitate the connection of the utility stationary contact to the utility terminal;

a contacting portion deposited on the backing portion and formed from a second material, the contacting portion of the utility stationary contact includes a first surface and a second surface engaging the backing portion of the utility stationary contact, the first and second surfaces of the utility stationary contact being spaced from each other by an outer edge;

a generator input connectable to the generator, the generator input including a generator stationary contact having:
  a backing portion operatively connected to a generator terminal and formed from the first material, the backing portion including:
    a first surface;
    a second surface interconnected to the first surface of the backing portion of the generator stationary contact by an outer edge; and
    a mounting head depending from the second surface of the backing portion of the generator stationary contact to facilitate the connection of the generator stationary contact to the generator terminal;
  a contacting portion deposited on the backing portion and formed from the second material, the contacting portion of the generator stationary contact includes a first surface and a second surface engaging the backing portion of the generator stationary contact, the first and second surfaces of the generator stationary contact being spaced from each other by an outer edge;

an output terminal connectable to the load;

a movable arm having a first end operatively connected to the output terminal and a second opposite end;

a movable contact connected to the second end of the movable arm; and a coil connectable to the generator and being operatively connected to the movable arm such that the movable arm is movable between a first contacting position wherein the movable contact engages the contacting portion of the utility stationary contact and a second non-contacting position wherein the movable contact is disengaged from the contacting portion of the utility stationary contact in response to the application of power to the coil by the generator.

15. The relay of claim 14 further comprising a biasing structure for urging the movable arm towards the non-contacting position.

16. The relay of claim 14 wherein the first material is copper and the second material is tungsten.

17. The relay of claim 14 wherein the first surface of the backing portion of the utility stationary contact has a first diameter and the second surface of the backing portion of the utility stationary contact has a second diameter greater than the first diameter.

18. The relay of claim 14 wherein the movable contact includes:
  a backing portion operatively connected to the second end of the movable arm and formed from the first material, the backing portion of the movable contact includes a first surface and a second surface interconnected to the second end of the movable arm and spaced from the first surface of the backing portion of the movable contact by an outer edge; and
  a contacting portion deposited on the backing portion of the movable contact and formed from the second material, the contacting portion of the movable contact includes a first surface directed towards the stationary contact and a second surface engaging the backing portion of the movable contact, the first and second surfaces of the contacting portion of the movable contact being spaced from each other by an outer edge.

19. The relay of claim 18 wherein the first surface of the contact portion of the movable contact has a first diameter and the second surface of the contacting portion of the movable contact has a second diameter greater than the first diameter.

20. The relay of claim 18 wherein the first surface of the contacting portion of the movable contact is generally arcuate and terminates at a crown.

* * * * *